Figure 1:
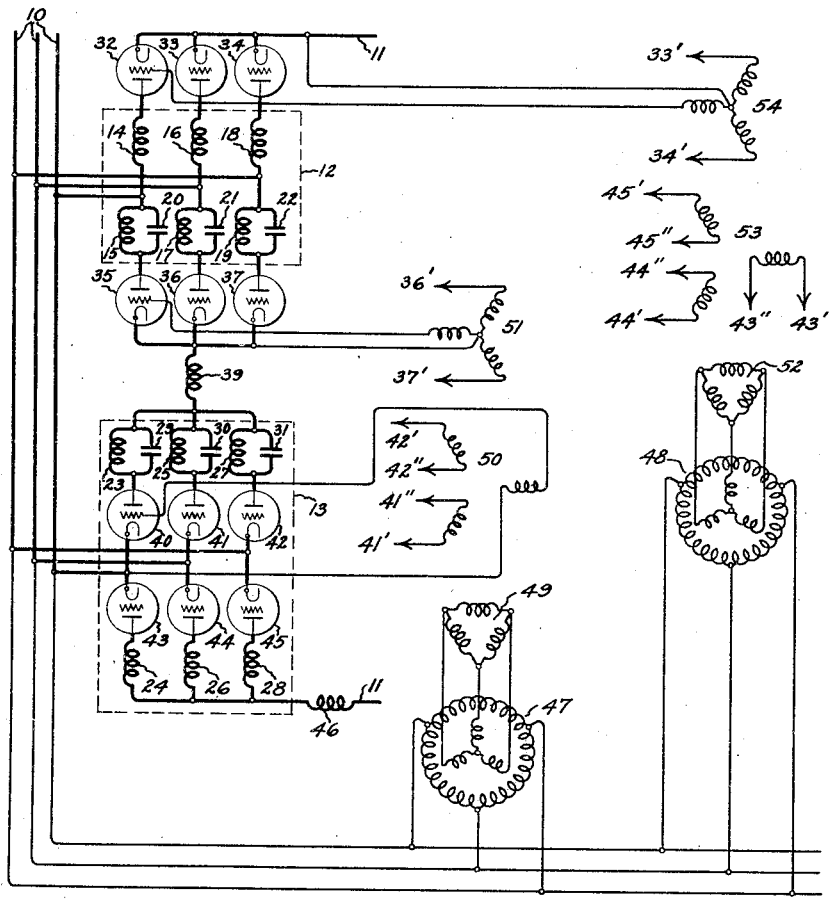

April 12, 1938.  C. A. SABBAH ET AL  2,114,193

ELECTRIC VALVE CONVERTING SYSTEM

Filed April 16, 1937  2 Sheets-Sheet 1

Inventors:
Camil A. Sabbah, Deceased.
by William A. Dodge, Administrator
Carl C. Herskind,
by Harry E. Dunham
Attorney.

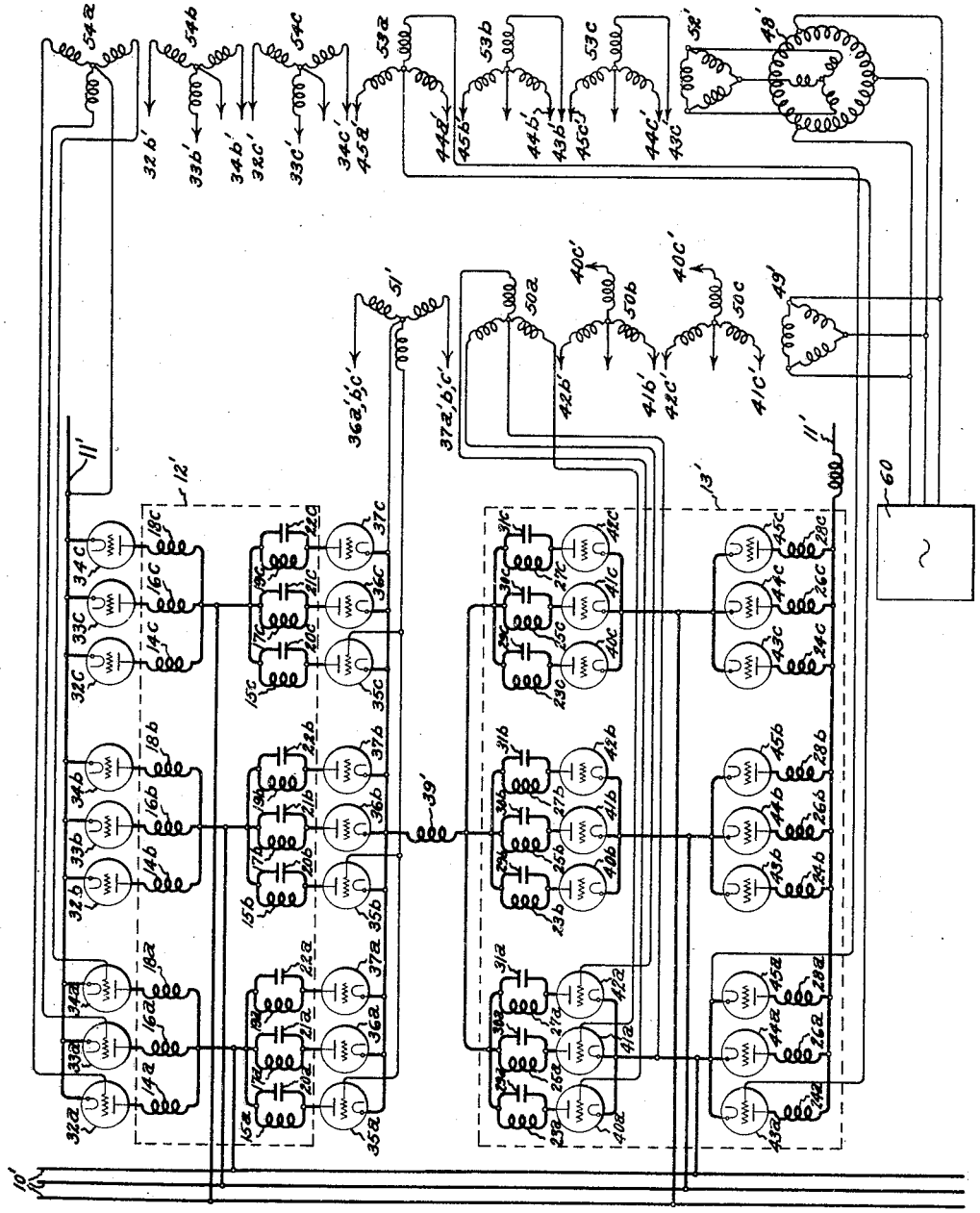

Patented Apr. 12, 1938

2,114,193

UNITED STATES PATENT OFFICE 2,114,193

ELECTRIC VALVE CONVERTING SYSTEM

Camil A. Sabbah, deceased, late of Schenectady, N. Y., by William A. Dodge, administrator, Schenectady, N. Y., and Carl C. Herskind, Scotia, N. Y., assignors to General Electric Company, a corporation of New York Application April 16, 1937, Serial No. 137,262

9 Claims. (Cl. 175—363)

This invention relates to electric valve converting systems, and more particularly to such systems suitable for transferring energy between direct and alternating currents.

An electric valve converting system suitable for transferring energy between constant potential and constant current circuits is disclosed in United States Letters Patent No. 1,961,080, granted May 29, 1934, upon the application of Camil A. Sabbah. The apparatus disclosed therein utilizes a multi-legged reactor having inductive windings on the several legs thereof, and an energy storage device or capacitor associated with at least a portion of the inductive windings on each leg. The inductive windings on each leg are provided with intermediate terminals which are connected together through a polyphase alternating current network. If desired, alternating power may be obtained from this system by coupling suitable inductive windings to the polyphase alternating current network.

In the copending application of Camil A. Sabbah, deceased, Serial No. 122,042, filed January 23, 1937, for Electric valve converting systems, there is disclosed an electric valve converting system suitable for transferring energy between direct and alternating current circuits. This particular system has a constant potential characteristic when the load resistance is below a certain value and a constant current characteristic when the load resistance exceeds a certain value. In certain instances, however, it may be desirable to provide an electric valve converting system having similar output characteristics which would permit the transfer of energy between a relatively low voltage alternating current circuit and a high voltage direct current circuit.

Accordingly, one of the objects of this invention is to provide an improved electric valve converting system which will operate to transfer energy between a low voltage alternating current circuit and a high voltage direct current circuit, and which will have a constant potential characteristic under certain load conditions and a constant current characteristic under other load conditions.

Another object of this invention is to provide an improved electric valve converting system of this type wherein the size of the apparatus comprising the system may be reduced to a minimum and which will be simple and reliable in operation.

It is a further object of this invention to provide an improved electric valve converting system for transferring energy between direct and alternating current circuits of different voltage ranges wherein the electric valve means are rendered conductive at a frequency which is higher than the frequency of the alternating current circuit.

It is a still further object of this invention to provide an improved electric valve converting system of this type wherein the capacitors utilized in the energy storage and transfer devices may be of a relatively low voltage rating.

Figure 1A:
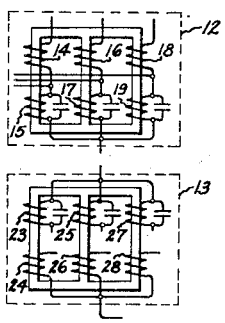

The novel features which are believed to be characteristic of this invention are set forth with particularity in the appended claims. The invention itself, however, both as to its organization and method of operation, together with further objects and advantages thereof, will be better understood by referring to the following description taken in connection with the accompanying drawings, in which Fig. 1 represents one embodiment of this invention; Fig. 1a represents the inductors used in the embodiment of Fig. 1; Fig. 2 is another modification of this invention wherein certain control electrodes are energized by a source of energy having a frequency higher than that of the alternating current circuit, and Fig. 2a represents one of the inductors used in the system shown in Fig. 2.

Referring now particularly to Fig. 1 of the drawings, there is illustrated an arrangement embodying this invention for transferring energy between an alternating current circuit 10 and a direct current circuit 11. The system as shown is provided with a plurality of energy storage and transfer devices, each comprising a multi-legged core structure denoted by the dotted lines 12 and 13, respectively. The core structures are shown in greater detail in Fig. 1a which shows that each of the magnetic structures is three-legged and is provided with a pair of windings on each leg thereof. Thus the core structure 12 is provided with three pairs of inductive windings 14, 15; 16, 17; and 18, 19. Each of these pairs of inductive windings is provided with an energy storage device which may be in the form of the capacitors 20, 21, and 22, which are preferably connected across the inductors 15, 17, and 19, respectively, so that the voltage rating of these capacitors may be as low as possible. The magnetic core structure 13, which also comprises a three-legged structure, is provided with three pairs of inductive windings 23, 24; 25, 26; and 27, 28, so that each leg thereof carries one of these pairs of windings. In order to form energy storage circuits, capacitors 29, 30, and 31 are connected respectively across the inductive windings 23, 25, and 27, or at least across portions thereof.

An electric discharge apparatus providing a controlled electric discharge path for each of the windings of the energy storage and transfer devices operates to control the flow of energy therethrough. While this electric discharge apparatus may be any of the several types well known in the art, it is desirable to utilize valves of the type containing an ionizable medium and which are provided with a control or starting electrode whereby the discharge paths between the anodes and cathodes may be controlled. For the purpose of clarity in disclosure, each of these control arc discharge paths is shown as a separate electric valve having a cathode, an anode and a control electrode in the form of a grid. Thus each of the windings 14, 16, and 18 is provided with an electric valve 32, 33, and 34, respectively, the anodes of which are connected to the inductive windings and the cathodes of which are connected to the other side of the direct current circuit 11. Inductive windings 15, 17, and 19, together with their associated capacitors are also provided with a plurality of electric valves 35, 36, and 37, respectively, the anodes of which are connected to the inductive windings and the cathodes of which are connected together through an inductive winding or choke 39 to one terminal of each of the windings 23, 25, and 27. The remaining terminals of the inductive windings 23, 25, and 27, together with their associated capacitors are connected to the anodes of the electric valves 40, 41, and 42. One terminal of each of the inductive windings 24, 26, and 28 is connected to the direct current circuit 11, whereas the other terminals of these windings are connected to the anodes of the electric valves 43, 44, and 45. In order to prevent any interaction between this electric valve converting apparatus and the direct current circuit 11, the direct current circuit 11 is provided with a smoothing reactor or inductor 46. The cathodes of the electric valves 40 and 43, 41 and 44, 42 and 46 are each connected together, and each of these pairs of cathodes is connected to a different one of the lines of the alternating current circuit 10. Each of the lines of the alternating current circuit 10 is also connected to the junction point between the inductive windings 14, 15; 16, 17; and 18, 19.

The control electrodes or grids of these various electric valves associated with the energy storage and transfer devices are controlled through apparatus energized from a suitable source of alternating current, such as the alternating current circuit 10, through phase shifting devices 47 and 48. The output of one phase shifting device 47 is connected to a transformer having a primary winding 49 and two secondary winding groups 50 and 51. One secondary winding group 50 is arranged to control the energization of the electric valves 40, 41, and 42, whereas the other secondary winding group 51 is arranged to control the energization of the electric valves 35, 36, and 37. The output of the other phase shifting device 48 is connected to a transformer having a primary winding 52 and two secondary winding groups 53 and 54. One secondary winding group 53 is arranged to control the energization of the electric valves 43, 44, and 45, whereas the other secondary winding group 54 is arranged to control the energization of the electric valves 32, 33, and 34. For the purpose of clarity, only certain terminals of the secondary winding groups 50, 51, and 54 have been connected with the control electrode and cathode of the respective valve groups which they control. The remaining terminals of these winding groups, which have not been connected in the drawings, have been given primed reference characters indicating that this terminal is to be connected to the grid of the valve carrying a corresponding reference character, and double prime reference characters to indicate that this terminal is to be connected to the cathode of the corresponding valve.

While for the purpose of illustration Fig. 1 discloses an arrangement for transferring energy between a polyphase alternating current circuit and a direct current circuit, it will be obvious to those skilled in the art that a similar arrangement utilizing two-legged core structures could be utilized for transferring energy between a single phase alternating current circuit and a direct current circuit. It furthermore will be apparent to those skilled in the art that while the apparatus shown is being described as comprising an arrangement for transferring energy from the alternating current circuit 10 to the direct current circuit 11, it may be utilized for transferring current in the opposite direction.

In operation, neglecting the leakage reactance between the windings common to each leg of the energy transfer devices 12 and 13, the windings and capacitors associated with the core structures thereof serve to maintain the total magnetomotive force and that of each of the legs of the magnetic core structure at a substantially constant value. Each of the electric discharge paths or valves 32 to 37 and 40 to 45 is conductive for 120 electrical degrees of each cycle, these valves becoming conductive in predetermined sequence at a frequency equal to that of the alternating current source 10, from which the control electrodes or grids are energized. In order to operate this system properly the phase relation between the grid excitation of the valves 35, 36, 37, 40, 41, and 42 and the valves 32, 33, 34, 43, 44, and 45 must be such that each of the valves of the one group becomes conductive in advance of the corresponding valve in the other group on the same leg of the energy storage and transfer device. This angle of advance between the excitation of the two corresponding groups of valves, as for example the valves 32 and 35, will lie between any value just greater than zero degrees and slightly less than 180 degrees. For optimum operation under certain load conditions, the maximum angle of advance between two corresponding groups of valves may be limited by these conditions to some intermediate value. The phase shifting devices 47 and 48 provide the means for obtaining this phase difference and also operate as a control means for determining the amount of energy transferred between the direct and alternating current circuits. The voltage relation and power transfer relation between the two circuits is also dependent upon the ratio between the windings of each pair of windings on each leg of the core structures 12 and 13; the size of the capacitors connected across the windings 15, 17, 19, 23, 25, and 27; and the phase relation between the excitation of the grids of the control electrodes of the valves 35 to 37, 40, to 42, and the valves 32 to 34, and 43 to 45.

For the purpose of explanation of the operation of this system, it will perhaps be best to assume that certain portions of the system disclosed operate to provide a particular component in the output circuit of the apparatus. It is believed that it will be apparent to those skilled in the art that the electric discharge paths or valves 32 to 34 and 43 to 45, inclusive, together with their associated inductors 14 to 18 and 24 to 28, inclusive, operate as a six-anode polyphase rectifier to supply to the direct current output circuit 11 a constant potential component. Thus, for instance, if it is assumed at a particular instance that the electric discharge path 32 has just been rendered conductive and that the electric discharge path 44 has previously been rendered conductive, a continuous path will be traced from the lower conductor of the direct current circuit 11, through the discharge path 44 to the middle conductor of the alternating current circuit 10, through the source of supply for the alternating current circuit (not shown) to the right-hand conductor of the alternating current circuit, through the electric discharge path 32 to the upper terminal of the direct current circuit 11. This condition exists for 60 electrical degrees, whereupon the electric discharge path 44 becomes nonconductive and the current is transferred to the electric discharge path 45. Thus, for this 60 electrical degrees a continuous path will be traced from the lower conductor of the direct current circuit 11, through the discharge path 45, to the left-hand conductor of the alternating current circuit 10, through the source of supply for this alternating current circuit (not shown) to the right-hand conductor of the alternating current circuit, through the discharge path 32 to the upper terminal of the direct current circuit 11.

At the same time that the valves 32, 44, and 45 are conductive, certain of the valves 35 to 37 and 40 to 42, inclusive, together with their associated inductors and capacitors operate as a portion of a constant current electric valve system. Thus, energy is transferred from the constant potential alternating current source 10 to the direct current circuit 11 in the form of a constant current direct current component. If it is assumed that the electric discharge path 37 was rendered conductive at the same instant that the electric discharge path 32 was rendered conductive, it will be found that the electric discharge path 40 has been rendered conductive at some previous time and that a complete circuit extends from the left-hand conductor of the alternating current circuit 10 through the electric discharge path 37, the conductor 39, the electric discharge path 40, to the right-hand alternating current conductor. This condition exists for sixty electrical degrees, whereupon current is transferred from the electric discharge path 40 to the electric discharge path 41, so that a circuit is now traced from the left-hand conductor of the alternating current circuit 10, through the discharge path 37, the conductor 39, the electric discharge path 41 to the middle conductor of the alternating current circuit 10. The conduction of current through any one of the inductors 15, 17, 19, 23, 25, and 27 operates during this period to charge the capacitors associated with these windings. During the period immediately following the time when the capacitor was being charged, the capacitor discharges into its associated winding for 120 electrical degrees so that the charge of the capacitor is reversed in polarity. At the end of this period, during which the capacitor is reversing in polarity, the valve or electric discharge path associated with the other winding on the same leg of the core structure becomes conductive and the conductor now discharges again into its associated winding, and the energy of this capacitor is transferred by magnetic induction to the other winding which is associated with the valve which has just been rendered conductive. This valve is conductive for 120 electrical degrees, during which time it now supplies to the direct current circuit 11 that component of constant current which is supplied by the energy storage circuit comprising the inductor and parallel connected conductor. Thus, it will be apparent to those skilled in the art that the electric discharge paths 32 to 34 and 43 to 45 not only operate to provide a constant potential component in the direct current circuit but also operate to permit the apparatus to provide a constant current component in the output circuit 11. Since the operation of electric valve converting systems suitable for transferring energy between constant potential and constant current circuits was previously disclosed in United States Letters Patent 1,961,080, granted May 29, 1934, upon an application of Camil A. Sabbah, and in a copending application for Electric valve converting systems for Camil A. Sabbah, deceased, Serial No. 89,591, filed July 9, 1936, it is not believed necessary to present any further detailed explanation thereof.

It is further believed that it will be apparent to those skilled in the art that the power factor of the converting apparatus in its entirety will change upon change of load conditions appearing across the output circuit 11, and hence when the converting apparatus is supplying power to a load which is decreasing in load resistance, the output characteristic will be primarily a constant potential characteristic. When, however, the load resistance is increased in value from a certain predetermined amount, the converting apparatus operates to provide primarily a constant current characteristic, although under certain load conditions, for the purpose of explanation, the apparatus may be considered as being a combination of two converting systems operating together so that above a certain predetermined point in the output characteristic the electric discharge paths 32 to 34 and 43 to 45 are providing the principal portion of the power in the form of power having a constant potential characteristic, and below this predetermined point in the output characteristic it may be assumed that the electric discharge paths 35 to 37 and 40 to 42 are supplying the principal portion of power in the form of energy having a constant current characteristic, which energy is transmitted to the direct current circuit 11 by means of electric discharge paths 32 to 34 and 43 to 45.

In Fig. 2 there is disclosed a further modification of my invention comprising an electric valve converting system suitable for transferring energy between direct and alternating current circuits. Since this system utilizes apparatus which corresponds to certain elements of Fig. 1, and the operation thereof is similar, these elements have been given primed reference characters. In some instances, however, these elements are replaced by a plurality of elements in which case corresponding elements have been indicated by alphabetical subscripts. Thus, the three-legged core structure 12′, which is shown in greater detail in Fig. 2a, is provided with a plurality of primary and secondary windings on one leg of the core structure. Thus, it will be seen that windings 14a, 14b, and 14c constitute a primary group on the three legs of the core structure, which windings are associated with windings 15a, 15b, and 15c, which are associated with capacitors 20a, 20b, and 20c, respectively. The windings 14a, 14b, and 14c are connected between different conductors of the alternating current circuit 10' and one side of the direct current circuit 11' by means of the electric discharge paths or valves 32a, 32b, and 32c, respectively. The core structure 13' is likewise provided with a plurality of primary and secondary windings on each leg of the core structure so as to correspond to the arrangement of the windings on the core structure 12'.

Each of the electric discharge paths is controlled by energy supplied from an alternating current source 60 which may be of any frequency other than the frequency of the alternating current circuit 10, but preferably is of a higher frequency. This energy is conducted to a primary winding 49' of a transformer which is provided with a secondary 51' and a group of secondaries 50a, 50b, and 50c, respectively. The transformer 51' has each of its windings connected to three electric valves such as, for example, 35a, 35b, and 35c. Each of the legs of the windings 50a, 50b, and 50c controls only a single electric valve so that, for example, the winding 50a controls the electric valves 40a, 41a, and 42a. Energy from the alternating current source 60 is also transferred through a phase shifting device 48' to the primary winding 52' of a transformer which is provided with two groups of secondary windings 53a, 53b, 53c, and 54a, 54b, and 54c. Thus, for example, the transformer winding 53a controls the electric discharge paths 43a, 44a, and 45a and the transformer winding 54a controls the electric discharge paths 32a, 33a, and 34a.

If the frequency of the alternating current source 60 is considerably higher than the frequency of the alternating current source 10', it will be apparent to those skilled in the art that the various electric discharge paths are rendered conductive at a higher frequency than was the case of the arrangement shown in Fig. 1, with the result that the capacitors associated with the inductive windings are smaller in size, thereby resulting in economic saving. Since the operation of the invention illustrated in Fig. 2 is substantially in accordance with the principles of operation set forth in detail in connection with the description of Fig. 1, it is, therefore, not believed that any further description is necessary for a complete understanding of this embodiment of the invention.

While this invention has been shown and described in connection with certain specific embodiments, it will, of course, be understood that it is not to be limited thereto, since it is apparent that the principles herein disclosed are susceptible of numerous other applications, and modifications may be made in the circuit arrangements and in the instrumentalities employed without departing from the spirit and scope of this invention as set forth in the appended claims.

What is claimed as new and desired to be secured by Letters Patent of the United States is:

1. An electric valve converting system for transferring power between alternating and direct current circuits comprising a plurality of energy storage and transfer devices each provided with a plurality of inductively coupled windings, a controlled electric discharge path for each winding of said devices, means connecting the windings of said devices and said associated electric discharge paths in a plurality of series circuits across said direct current circuit, means for connecting a portion of the windings of each of said devices together with certain associated electric discharge paths in a plurality of series circuits across said alternating current, and means for controlling the conductivities of said electric discharge paths.

2. An electric valve converting system for transferring power between alternating and direct current circuits, comprising a plurality of energy storage and transfer devices each provided with a plurality of inductively coupled windings, a controlled electric discharge path for each winding of said devices, means connecting the windings of said devices and said associated electric discharge paths in a plurality of series circuits across said direct current circuit, means for connecting a portion of each of said series circuits including a winding of each of said devices together with certain associated electric discharge paths in series relation across said alternating current circuit, a control circuit for said electric discharge paths, and means for controlling the conductivities of said electric discharge paths at the frequency of said alternating current circuit.

3. An electric valve converting system for transferring power between alternating and direct current circuits, comprising a plurality of energy storage and transfer devices each provided with a plurality of pairs of inductive windings, electric discharge apparatus providing a controlled electric discharge path for each of said windings, means for connecting one winding of each of said pairs of windings of each device together with their associated electric discharge paths in series relation across said alternating current circuit, means for connecting across said direct current circuit the remaining windings and their associated electric discharge paths in series relation with said first-mentioned series connected windings, and means for controlling the conductivities of said electric discharge paths.

4. An electric valve converting system for transferring power between direct and alternating current circuits comprising a plurality of n-legged energy storage and transfer devices each having a pair of inductive windings on each leg thereof, electric discharge apparatus providing a controlled electric discharge path for each of said windings, means for connecting one of the windings on each leg of one of said devices in series relation with one of the windings on each leg of the other of said devices, means for connecting across said alternating current line said series connected windings together with their associated electric discharge paths, means for connecting all of said windings of each leg of one of said devices together with their associated electric discharge paths with the windings and associated electric discharge paths of the other of said devices in a series relation across said direct current circuit, and means for controlling the conductivities of said electric discharge paths.

5. An electric valve converting system for transferring energy between a relatively high voltage direct current circuit and a relatively low voltage alternating current circuit, comprising a plurality of energy storage and transfer devices, each provided with two groups of inductive windings, electric discharge apparatus providing a controlled electric discharge path for each of said windings, means for interconnecting one group of said windings and their associated electric discharge paths of each device in series with the other and with said alternating current circuit, means for connecting the remaining groups of windings and their associated electric discharge paths across said direct current circuit in series relation with said first-mentioned groups of windings associated with said alternating current circuit, and means for controlling the conductivity of said electric discharge paths.

6. An electric valve converting system for transferring power between alternating and direct current circuits comprising a plurality of energy storage and transfer devices each provided with two groups of inductive windings, electric discharge apparatus providing a controlled electric discharge path for each winding of said groups of windings, means for connecting one group of windings of each device together with their associated electric discharge paths in series relation across said alternating current circuit, means for connecting across said direct current circuit the remaining groups of windings and their associated electric discharge paths in series relation with said first-mentioned series connected winding groups, and means for controlling the conductivities of said electric discharge paths at a frequency other than the frequency of said alternating current circuit.

7. An electric valve converting system for transferring energy between a direct current circuit and an alternating current circuit of a relatively lower voltage, comprising a plurality of energy storage and transfer devices each provided with two groups of inductive windings, electric discharge apparatus providing a controlled electric discharge path for each of said windings, means interconnecting one group of said windings and their associated electric discharge paths of each device in series with the other across said alternating current circuit, means for connecting the remaining groups of windings and their associated electric discharge paths across said direct current circuit in series relation with said first-mentioned group of windings associated with said alternating current circuit to introduce into said direct current circuit a constant current component, said remaining groups of windings and their associated electric discharge paths also being connected to said alternating current circuit to supply to said direct current circuit a constant potential component, and means for controlling the conductivities of said electric discharge paths at a frequency other than the frequency of said alternating current circuit.

8. An electric valve converting system for transferring energy between alternating and direct current circuits comprising a plurality of energy storage and transfer devices each provided with two groups of inductive windings, electric discharge apparatus providing a controlled electric discharge path for each winding of said groups of windings, means for connecting all of said groups of windings and their associated electric discharge paths in series relation across said direct current circuits, means for interconnecting one group of windings of each device with said alternating current circuit, means for controlling the conductivities of said electric discharge paths, and means for shifting the instants of conductivities of the electric discharge paths associated with one of said circuits relative to the instants of conductivities of the electric discharge paths associated with the other of said circuits to control the transfer of energy between said circuits.

9. An electric valve converting system for transferring energy between a relatively high voltage direct current circuit and a relatively low voltage alternating current circuit, comprising a plurality of energy storage and transfer devices, each of said devices being provided with two groups of inductive windings, electric discharge apparatus providing a controlled electric discharge path for each of said windings, means for interconnecting one group of windings of one of said devices and their associated electric discharge paths in series with one group of windings of the other of said devices and their associated electric discharge paths and means interconnecting said series connected winding groups with said alternating current circuit, means for connecting the remaining groups of windings and their associated electric discharge paths across said direct current circuit in series relation with said first-mentioned group of windings associated with said alternating current circuit, a control circuit for said controlled electric discharge paths, and means for energizing said control circuit with current having a frequency other than the frequency of said alternating current circuit.

WILLIAM A. DODGE,
*Administrator of the Estate of Camil A. Sabbah, Deceased.*

CARL C. HERSKIND.